(12) United States Patent
Chari et al.

(10) Patent No.: US 6,449,288 B1
(45) Date of Patent: Sep. 10, 2002

(54) BI-LEVEL FRAMING STRUCTURE FOR IMPROVED EFFICIENCY DSL OVER NOISY LINES

(75) Inventors: Sriraman Chari, Fremont; Anthony J. P. O'Toole, San Jose, both of CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/251,723

(22) Filed: Feb. 17, 1999

Related U.S. Application Data

(60) Provisional application No. 60/084,894, filed on May 9, 1998.

(51) Int. Cl.[7] .................................................. G06F 11/00
(52) U.S. Cl. ..................... 370/470; 370/474; 370/476; 714/701; 714/786
(58) Field of Search .............................. 370/441, 470, 370/471, 474, 476, 485; 714/776, 786, 789, 701, 702

(56) References Cited

U.S. PATENT DOCUMENTS

| | | | |
|---|---|---|---|
| 5,124,943 A | 6/1992 | Lubarsky | 395/200 |
| 5,511,079 A | 4/1996 | Dillon | 371/43 |
| 5,590,161 A | 12/1996 | Meyn et al. | 375/368 |
| 5,606,577 A | 2/1997 | Grube et al. | 375/295 |
| 5,673,266 A | 9/1997 | Li | 370/465 |
| 5,677,911 A * | 10/1997 | Fimoff et al. | 714/701 |
| 5,699,369 A | 12/1997 | Guha | 371/41 |
| 5,717,689 A | 2/1998 | Ayanoglu | 370/349 |
| 5,717,762 A | 2/1998 | Aihara et al. | 380/49 |
| 5,719,883 A | 2/1998 | Ayanoglu | 371/35 |
| 5,737,337 A | 4/1998 | Voith et al. | 371/2.2 |
| 6,175,943 B1 * | 1/2001 | Yim | 714/769 |
| 6,311,305 B1 * | 10/2001 | Sollish et al. | 714/784 |
| 6,349,138 B1 * | 2/2002 | Doshi et al. | 380/200 |
| 6,356,555 B1 * | 3/2002 | Rakib et al. | 370/441 |

OTHER PUBLICATIONS

ITU—Telecommunication Standardization Sector, Study Group 15, Temporary Document NF–065.

* cited by examiner

*Primary Examiner*—Alpus H. Hsu
*Assistant Examiner*—Roberta Stevens
(74) *Attorney, Agent, or Firm*—Stuart T. Auvinen

(57) ABSTRACT

A bi-level framing structure for DSL phone systems uses 4 KHz physical frames and mux data frames. The mux data frames each start with a sync byte and contain user payload bytes. A group of mux data frames are appended with forward-error-correction FEC bytes to make a codeword. The codeword is then partitioned into physical 4-KHz frames. The physical frames are transformed by an inverse fast-Fourier transform (IFFT) outputting symbols at 4 KHz for transmission. For high line rates, each codeword has S mux data frames and S physical frames. There are also at least S FEC bytes if error correction is enabled. However, for lower line rates, there are S physical frames but only S/M mux data frames in each codeword. The efficiency factor M is 1 for high line rates, but 4 for lower line rates. Reducing the number of mux data frames reduces the number of sync bytes in a codeword, decreasing overhead. The FEC bytes are spread among more physical frames, reducing error-correction overhead. The symbol rate and the rate of physical frames remains at 4 KHz, even at the lower line rate. The smaller number of bytes per symbol at the lower line rates is compensated for by reducing the number of mux data frames per 4 KHz frame, allowing larger, more efficient mux data frames and error correction to be used. Thus bandwidth efficiency is increased for lower line rates.

20 Claims, 9 Drawing Sheets

| Line Rate | $R_I$ | Normal Mode | | Efficient Mode | |
| --- | --- | --- | --- | --- | --- |
| | | Parameters | Efficiency | Parameters | Efficiency |
| 96 Kbit/s | 0 | S=1, M=1, $F_S$=1 | 67% | S=4, M=4, $F_S$=4 | 92% |
| 96 Kbit/s | 4 | S=4, M=1, $F_S$=1 | 33% | S=16, M=4, $F_S$=4 | 83% |
| 96 Kbit/s | 16 | S=16, M=1, $F_S$=1 | 33% | S=16, M=4, $F_S$=4 | 58% |
| 128 Kbit/s | 0 | S=1, M=1, $F_S$=1 | 75% | S=4, M=4, $F_S$=4 | 94% |
| 128 Kbit/s | 4 | S=4, M=1, $F_S$=1 | 50% | S=16, M=4, $F_S$=4 | 88% |
| 128 Kbit/s | 16 | S=16, M=1, $F_S$=1 | 50% | S=16, M=4, $F_S$=4 | 69% |
| 256 Kbit/s | 0 | S=1, M=1, $F_S$=1 | 88% | S=4, M=4, $F_S$=4 | 97% |
| 256 Kbit/s | 4 | S=4, M=1, $F_S$=1 | 75% | S=16, M=4, $F_S$=4 | 94% |
| 256 Kbit/s | 16 | S=16, M=1, $F_S$=1 | 75% | S=16, M=4, $F_S$=4 | 84% |

Fig. 9

BI-LEVEL FRAMING STRUCTURE FOR IMPROVED EFFICIENCY DSL OVER NOISY LINES

This application is a continuation of provisional application 60/084,894, filed May 9, 1998.

FIELD OF THE INVENTION

This invention relates to Digital-Subscriber Lines (DSL) systems, and more particularly to framing structures for lower line rates.

BACKGROUND OF THE INVENTION

Telephone systems are increasingly being used to carry data traffic as well as voice calls. While analog modems were sufficiently useful for lower data rates, graphics, audio, and video data transfers have increased data-rate requirements. Integrated Services Digital Network (ISDN) and more recently Digital-Subscriber Line (DSL) including asymmetric DSL (ADSL) have been developed to provide higher data rates.

DSL systems have been developed that carry data on many carriers at the same time. The carriers are modulated in phase and amplitude to carry the data signals. Since multiple carriers separated in frequency are used, this technique is known as discrete multi-tone (DMT).

The data to be transmitted over the phone line is first framed by adding sync bytes and error correction bytes and blocking into symbols which are generated at an average 4 KHz rate. Based on the line characteristics a mapper assigns a different number of bits to each tone used. A constellation encoder modulates the various carriers with the data bits to produce a frequency domain signal. This signal is then converted from the frequency domain to the time domain by an inverse fast-Fourier transform (IFFT). This time domain signal is then converted from digital to analog voltages that drive the physical phone line (copper twisted pair).

Various other encoding techniques such as trellis encoding can be inserted before the IFFT. The actual signal on the phone line bears little resemblance to the user data once the various transformations and encodings are performed. Nevertheless, the data is arranged into frames before the transform and encoding, and the received data is also arranged in frames once transforms and decodings are completed.

FIG. 1A shows a high-rate DSL system. A user data stream is framed with sync and error-correction bytes to produce a 1.536 mega-bits-per-second (1.536 Mbits) stream. This information stream is divided into many frequency bins and input to IFFT 10. IFFT 10 converts a set of frequency bins into a series of time points every 250 μsec in response to the 4 KHz system clock. Since a large number of frequency bins are used for the high user-data rate, the time-points output by IFFT 10 represents a symbol with many data bytes.

Symbol 12 represents 48 bytes of information transmitted over the phone line. A new symbol 12 is output by IFFT 10 for every period of the 4 KHz clock. Thus the data rate transmitted over the phone line, the line rate, is 48 bytes×4 KHz=192 Bytes/sec, or 1.536 Mbits.

Telephone systems have traditionally used 4–8 KHz system clocks, and occasionally 4 KHz framing clocks. The IFFT is also clocked at the 4 KHz rate, outputting symbols at the 4 KHz rate. Framing is defined based on this 4 KHz physical layer. Thus each frame contains 48 bytes for the high-rate DSL system. Such a DSL system is being proposed for an International Telecommunications Union (ITU) standard known as G.Lite.

FIG. 1B shows a low-rate DSL system. Since the existing copper-pair telephone wires are used for DSL, the quality of the lines varies. Some customers may have poor-quality or longer lines that cannot support the high-rate DSL system of FIG. 1A. The physical lines of FIG. 1B support a line rate of only 64 Kbit. When the 4 KHz system clock is used, and symbols are output by IFFT 10 at the 4 KHz rate, each symbol 12 represents only 2 bytes (16 bits).

FIG. 2A shows a frame for a high-rate DSL system. Mux data frame 14 begins with one sync byte S, leaving 47 bytes for user data, the payload bytes P. The amount of the channel used for sync overhead is only 1/46.

FIG. 2B shows a frame for a low-rate DSL system. Mux data frame 14 begins with one sync byte S. Since each symbol is only 3 bytes, only two bytes are available for user data, payload bytes P. One-third of the channel is used for sync overhead. Thus framing based on the 4 KHz physical layer is inefficient at low line rates.

Error correction is often employed in DSL systems. Reed-Solomon (RS) forward-error-correction (FEC) bytes can be appended to a series of mux data frames to allow for detection and correction of errors within the frames. The FEC bytes together with the mux data frames form a RS codeword.

FIG. 3A shows a RS codeword using high-rate mux data frames. Four mux data frames 14 are provided with error correction by RS FEC bytes 16. The number of bytes in FEC bytes 16 can be increased to improve error correction ability, but in this example one FEC byte is provided for each mux data frame 14. Thus FEC bytes 16 includes 4 FEC bytes.

The channel overhead is relatively small. With 4 mux data frames, 4 sync bytes and 4 FEC bytes are used, for a total of 8 overhead bytes. The number of user payload bytes is 62×4, or 248 bytes.

FIG. 3B shows a RS codeword using low-rate mux data frames. Four mux data frames 14 are provided with error correction by RS FEC bytes 16. One FEC byte is still provided for each mux data frame 14. Thus FEC bytes 16 includes 4 FEC bytes.

The channel overhead is quite high. With 4 mux data frames, 4 sync bytes and 4 FEC bytes are used, for a total of 8 overhead bytes. However, the number of user payload bytes is just 4 bytes. Thus ⅔'s of the channel is used for overhead.

FIG. 4 shows a framing structure for DSL. The G.Lite framing structure is based on the 4 KHz physical layer. User data and sync bytes are multiplexed into mux data frames 14. Each mux data frame 14 has 1 sync byte and $N_p$ user payload bytes, for a total of $K_i$ bytes. Mux data frames 14 are arranged together into RS codewords. Each RS codeword 20 contains S mux data frames 14. The RS codeword ends with $R_i$ FEC byte 16.

The RS codewords 20 are then sent to the IFFT to be transformed into symbols for transmission over the phone line. The IFFT operates at a 4-KHz rate, continuously outputting one symbol or 4-KHz frame 22 every 250 μsec. The stream of 4-KHz frames 22 from the IFFT is converted to analog voltages to drive the phone line as output stream 24.

The G.Lite standard requires that the number of 4-KHz frames 22 in a RS codeword is equal to the number of mux data frames 14 in the same RS codeword. Thus each 4-KHz frame 22 is slightly longer than each mux data frame 14. The additional length is due to the FEC bytes 16 that must be allocated among the 4-KHz frames 22. This number of frames, either mux data frames 14 or 4-KHz frames 22, is known as parameter S. Each 4-KHz frame 22 is thus $R_i/S$ bytes longer than each mux data frame 14.

The values of $R_i/S$ are further restricted to integer values. Integer values of $R_i/S$ ensures that the number of bytes per 4-KHz frame is also integer as the number of bytes per 4-KHz frame is equal to $K_r+R_i/S$ . . . This simplifies data paths in the DSL system.

The restriction for integer values of $R_i/S$ ensures that at least as many FEC bytes as there are 4-KHz frames. Also, one sync byte is contained in each mux data frame 14 and thus there are as many sync bytes as 4-KHz frames. For high-rate systems, an overhead of 2 bytes per 4-KHz frame is small. However, for low-rate systems, this 2-byte-per frame overhead is great. When each 4-KHz frame has only 3 bytes, such as for 96 Kbits, over 66% of the channel is spent on overhead. Thus high-rate DSL systems do not scale well to lower rate systems. Bandwidth efficiency is especially poor for low line rates.

It is desirable to provide DSL at both high and low line rates. Then a single DSL board or chip set could be used for both high-rate and low-rate applications. A more efficient framing structure for low-line rates is desired. It is desired to continue to use the 4-KHz system clock for physical framing, but to increase the bandwidth available for user payload bytes at low line rates. It is desired to extend the framing structure for high line rates to provide more bandwidth efficiency at lower line rates. A unified framing structure for both high and low rate DSL is desired.

SUMMARY OF THE INVENTION

A bi-level framer is for framing data transmitted over a line at a low line rate. The bi-level framer has a mux-framer that receives user payload bytes and a sync byte. It generates mux data frames by appending $N_p$ user payload bytes to the sync byte.

A byte-corrector receives a plurality of S/M of the mux data frames from the muxframer. It generates a plurality of $R_i$ forward-error correction FEC bytes. A symbol-framer receives the plurality of S/M mux data frames from the mux-framer and receives the plurality of $R_i$ FEC bytes from the byte corrector. It generates a plurality of S symbol frames from the S/M mux data frames and the $R_i$ FEC bytes.

A symbol generator is responsive to a system clock. It generates a symbol for transmission over the line for each symbol frame from the symbol-framer.

M is an efficiency factor that is 1 when transmitting at a high line rate above the low line rate, but a positive integer greater than one when transmitting at the low line rate. Thus one symbol is transmitted for each mux data frame at the high line rate, but M symbols are transmitted for each mux data frame at the low line rate.

In further aspects the symbol clock has a constant frequency for all line rates including the low line rate and the high line rate. Thus symbols are transmitted at a constant rate. The constant frequency of the symbol clock is about 4 KHz. Symbols transmitted at the low line rate represent fewer of the user payload bytes than symbols transmitted at the high line rate.

In still further aspects, M is 2 or 4 for the low line rate and S is 4, 8 or 16, and S/M is an integer.

In other aspects the symbol generator performs an inverse fast-Fourier transform (IFFT) to generate each symbol. One IFFT operation is performed for each symbol transmitted.

In further aspects the low line rate is at least 64 K bits per second but no more than 256 K bits per second while the high line rate is greater than 1 Megabits per second.

BRIEF DESCRIPTION OF THE DRAWINGS

FIG. 9 is a table comparing efficiencies of various configurations using the bi-level framing structure.

DETAILED DESCRIPTION

The present invention relates to an improvement in DSL framing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the existing DSL framing structure is inefficient for lower line rates. While an entirely new framing structure could be developed, the inventors realize that an extension or modification of the existing framing structure is more beneficial. A DSL chip set could then be designed that can operate efficiently at both high and low line rates.

The inventors desire to maintain the framing based on the 4 KHz system clock, but to relax some aspects of the framing to improve efficiency. Some but not all aspects of framing is then based on the 4-KHz system clock. This improves efficiency while still maintaining backwards compatibility.

The inventors have further realized that the requirement for one sync byte per frame is wasteful in many situations. The inventors provide an option to include a sync byte just once for several frames, rather than once per frame.

The inventors further realize that increasing the ratio of FEC bytes to payload bytes at lower rates is not always desirable. The inventors further realize that error correction bytes can be assembled from several different frames, allowing one error-correction byte to be divided among several frames. This reduces the overhead per frame for error-correction.

Figure 1A:
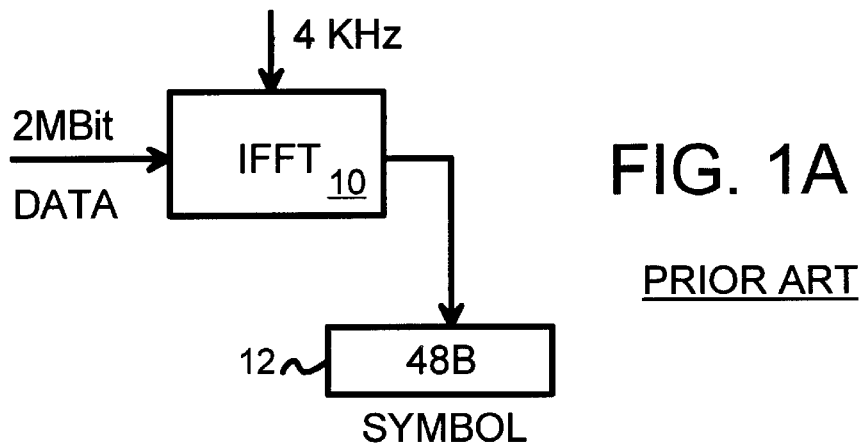
FIG. 1A shows a high-rate DSL system.
Figure 1B:
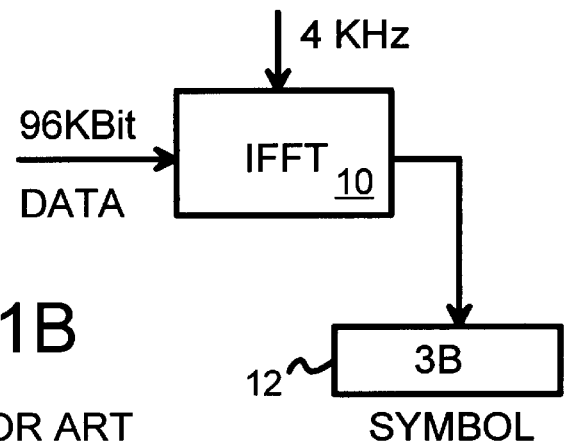
FIG. 1B shows a low-rate DSL system.
Figure 2A:
FIG. 2A shows a frame for a high-rate DSL system.
Figure 2B:
FIG. 2B shows a frame for a low-rate DSL system.
Figure 3A:
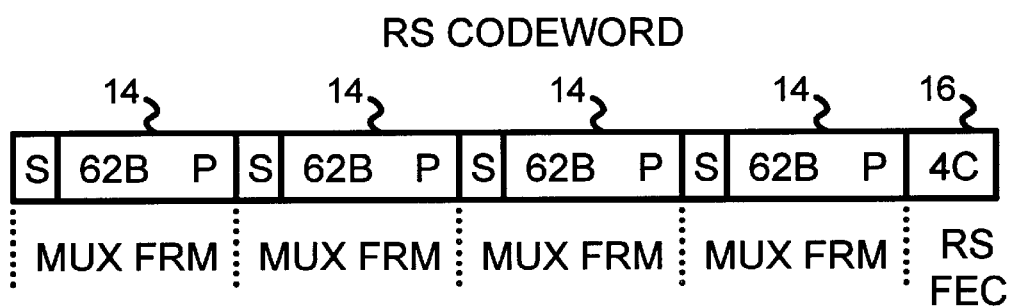
FIG. 3A shows a RS codeword using high-rate mux data frames.
Figure 3B:
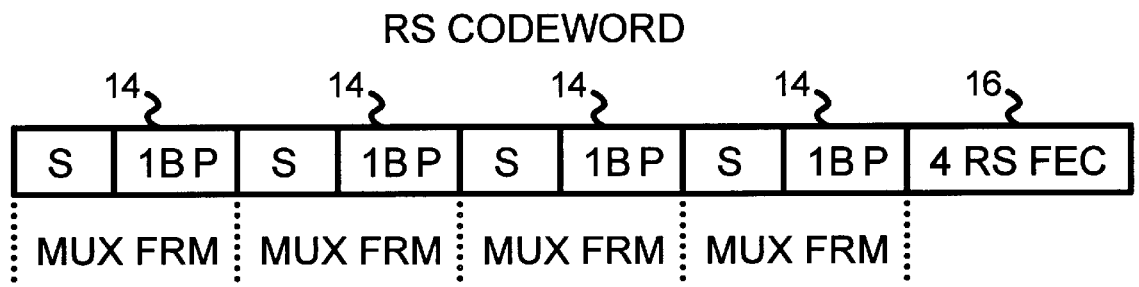
FIG. 3B shows a RS codeword using low-rate mux data frames.
Figure 4:
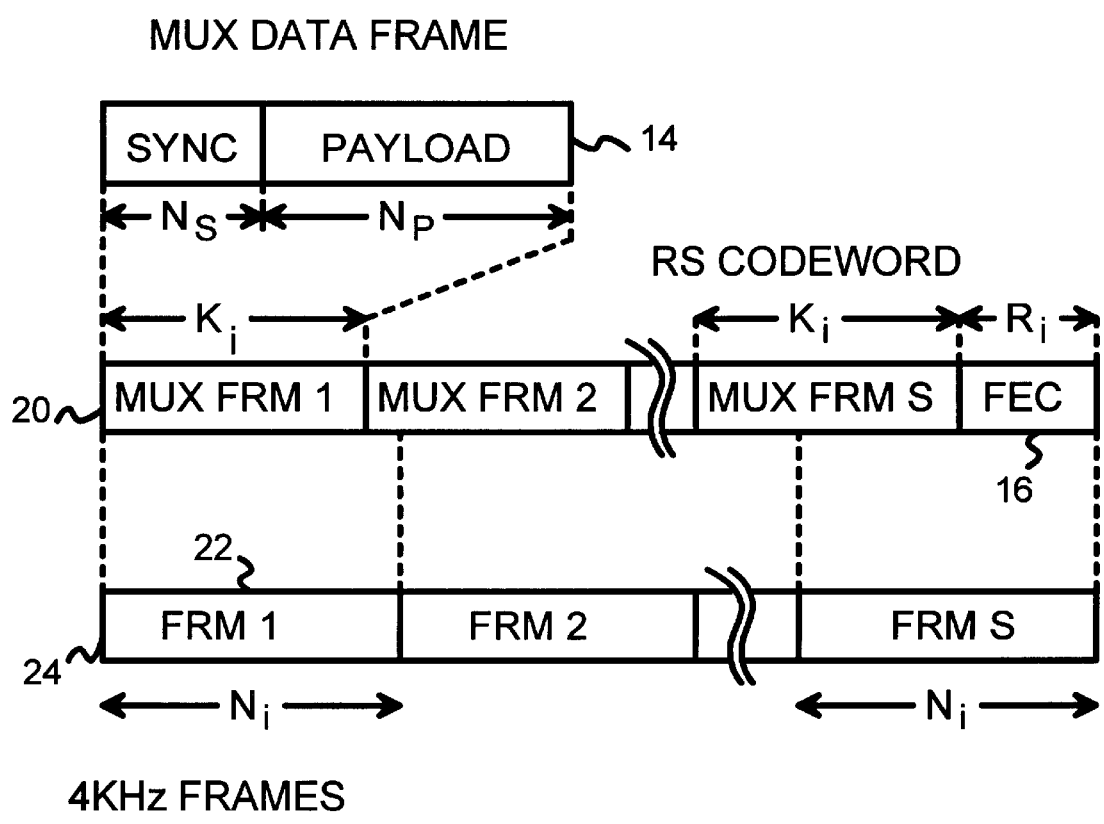
FIG. 4 shows a framing structure for DSL.
Figure 5:
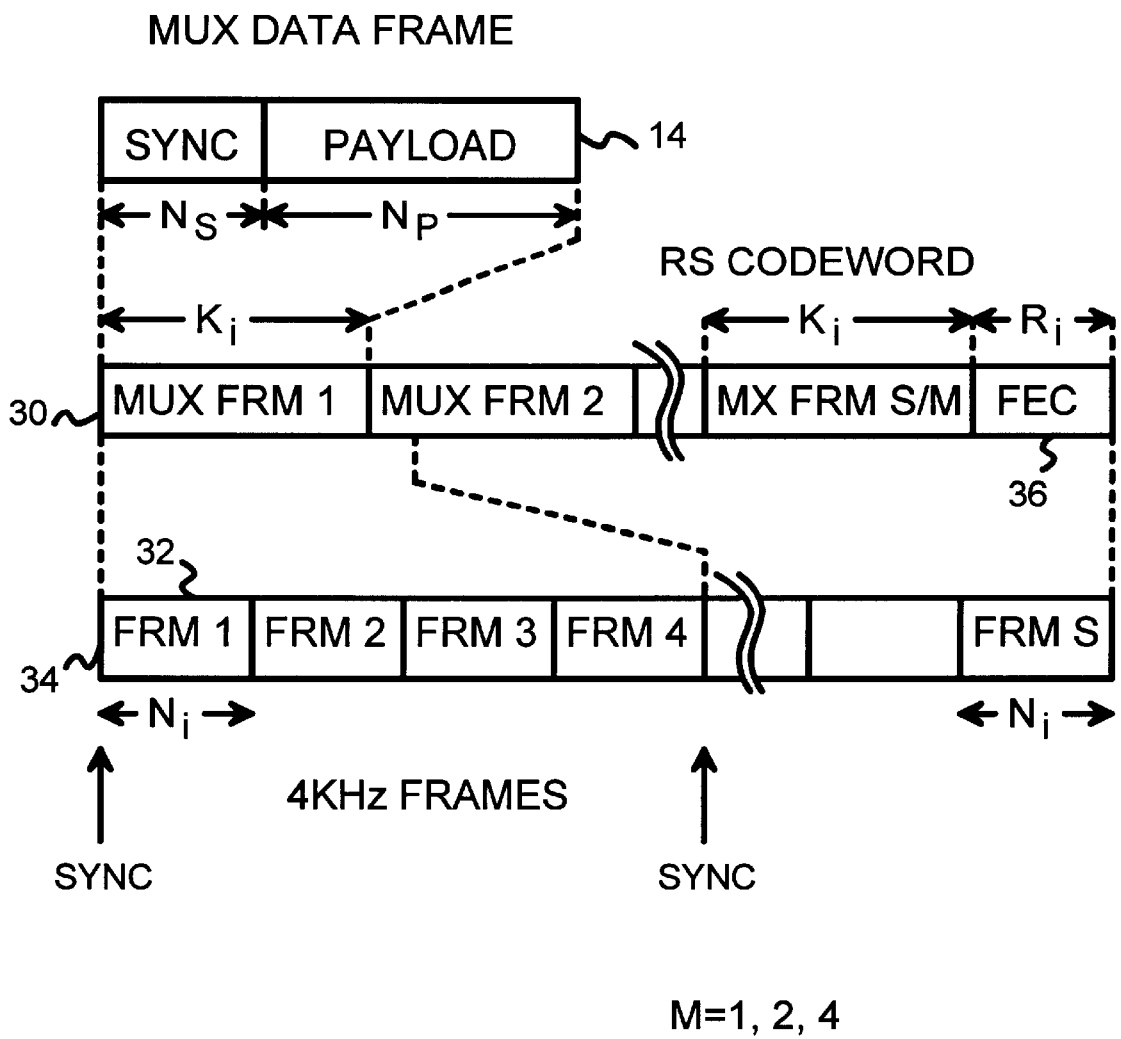
FIG. 5 shows an efficient low-line-rate framing structure for DSL.

Efficient Framing Structure—FIG. 5

FIG. 5 shows an efficient low-line-rate framing structure for DSL. The improved framing structure is partially but not entirely based on the 4-KHz physical layer. User data and sync bytes are multiplexed into mux data frames 14 at either a 2-KHz rate (M=2), or a 1-KHz rate (M=4). Each mux data frame 14 has $N_S$ sync bytes and $N_P$ user payload bytes, for a total of $K_i$ bytes. Mux data frames 14 are arranged together into RS codewords. The value of $N_S$ can be set to 1 for the most efficient option, or as high as M to provide more bandwidth for the EOC and AOC protocols. The RS codeword ends with $R_i$ FEC byte36.

Each RS codeword 30 contains S/M mux data frames 14. M is a positive-integer parameter representing the rate of 4-KHz frames per mux data frame. For example, when M=4, each mux data frame 14 is split among four 4-KHz frames 32. Since S/M is a smaller number than S, each RS codeword 30 has fewer mux data frames 14. This allows each mux data frame 14 to be larger. The mux data frame size can be increased by only increasing the number of user payload bytes P. Since one sync byte is shared among a larger number of payload bytes, efficiency increases.

The Reed Solomon (RS) codewords 30 are sent to the IFFT to be transformed into symbols for transmission over the phone line. The IFFT continues to operate at the 4-KHz rate, continuously outputting one symbol or 4-KHz frame 32 every 250 $\mu$sec. The stream of 4-KHz frames 32 from the IFFT is converted to analog voltages to drive the phone line as output stream 34.

The number of 4-KHz frames 32 in a RS codeword may be more than the number of mux data frames 14 in the same RS codeword. The example shows four 4-KHz frames 32 for each mux data frame 14 (M=4). The 4-KHz frames are also slightly longer due to the FEC bytes 36 that are allocated among the 4-KHz frames 32. The number of 4-KHz frames 32 is known as parameter S. Each group of M 4-KHz frames 32 is $R_i/S$ bytes longer than each mux data frame 14.

To keep the number of bytes in a 4 KHz frame integer only the value $M*R_i/S$ needs to be integer. This allows values of $R_i/S$ to be fractional. Fractional values allow the number of FEC bytes to be less than the number of 4-KHz frames. This further reduces the overhead per mux data frame. The overhead per mux data frame for FEC bytes is $M*R_i/S$, while the overhead for sync bytes is $N_S$, for a total overhead per mux data frame of $N_S+M*R_i/S$. The efficiency, or percent of the bandwidth for user payload is $N_P/(N_P+N_S+M*R_i/S)$.

The values of the various parameters are negotiated during initialization between the sending and receiving DSL modems using handshaking. Parameters S, $R_i$, and $F_S$ are selected through negotiation. Parameter S, the number of 4-KHz frames per codeword, can be 1, 2, 4, 8, or 16, while parameter $R_i$, the number of FEC bytes per codeword, can be 0, 4, 8 or 16. $F_S$ is the overhead bandwidth factor, and sets the number of sync bytes per mux data frame. For standard framing $F_S$ is set to 1; for efficient framing if M is 2, $F_S$ can be set to 2 to keep the framing overhead channel equal to standard mode (32 Kbit), or can be set to 1 to reduce it by half to 16Kbit. For efficient mode framing with M equal to 4, $F_S$ can be set to 4 to keep the framing overhead the same as standard mode, or set to 2 to reduce to 16 Kbit, or 1 to reduce to 8 Kbit.

Figure 6:
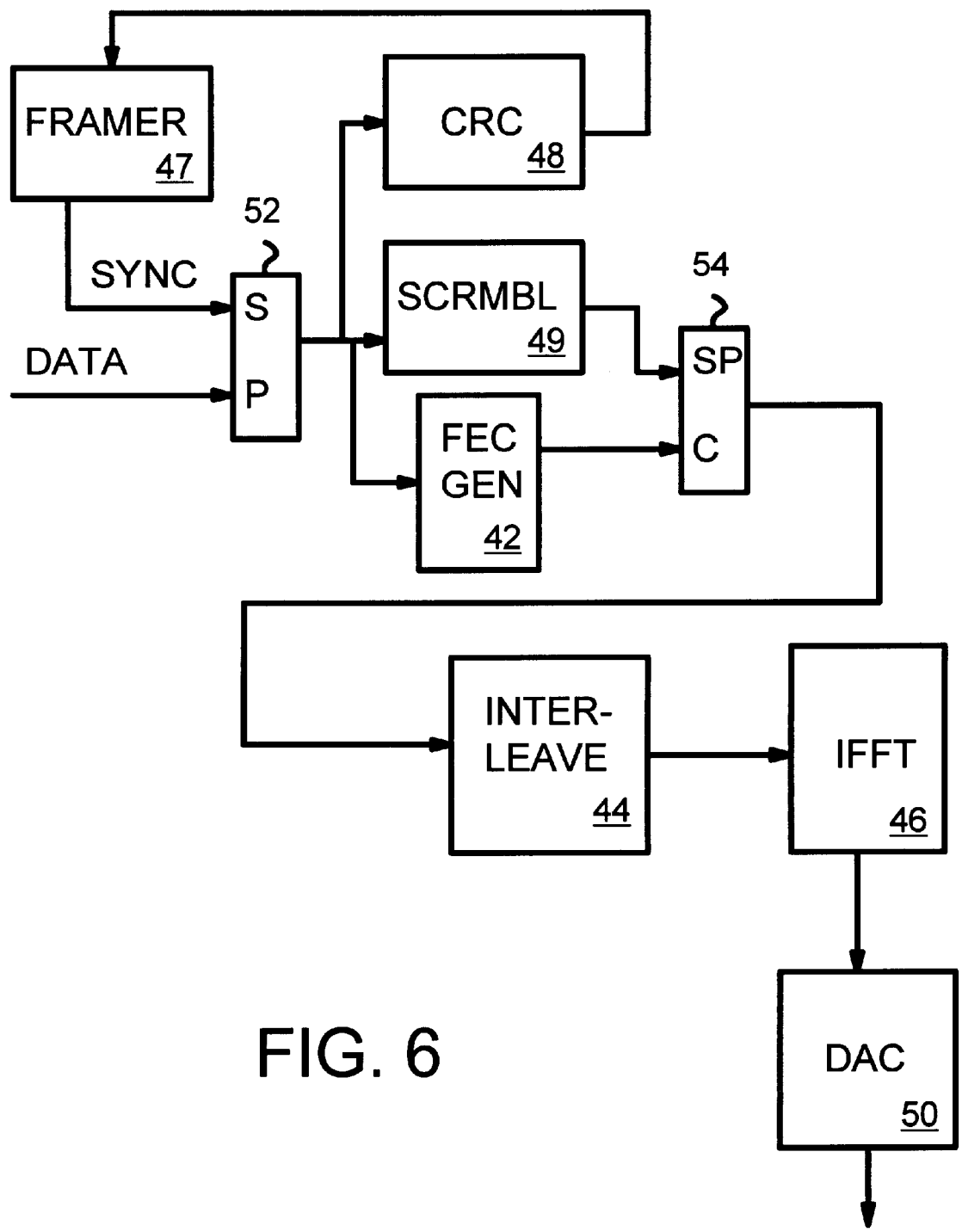
FIG. 6 is a block diagram of a DSL transmitter.

Transmitter Data Muxing—FIG. 6

FIG. 6 is a block diagram of a DSL transmitter. Sync bytes are applied to input S while user payload bytes are applied to input P of mux 52. Mux 52 selects $N_S$ sync bytes at the start of a mux data frame, and then $N_P$ payload bytes. Mux 52 outputs the mux data frame.

The mux data frames generated by mux 52 are sent to the FEC generator 42, scrambler 49, and CRC generator 48. The CRC generated by CRC generator 48 is transmitted as the first sync byte of every superframe (1 superframe=68/M mux data frames) by framer 47. Error correction FEC bytes for the mux data frames are generated on-the-fly by FEC generator 42. At the end of a RS codeword, mux 54 switches to the codeword input C to append the FEC bytes from FEC generator 42 to the mux data frames from mux 52. Thus RS codewords are assembled by mux 54. Codewords are then optionally interleaved by interleaver 44 to decrease the susceptibility of the data to burst noise. The resulting data is fed to the PMD (Physical Media dependent) layer, one of the functions of which is to perform IFFT 46. The digital output of the PMD is then converted to analog voltages by DAC 50 so that the copper-pair phone line can be driven by analog-voltage line drivers.

Figure 7:
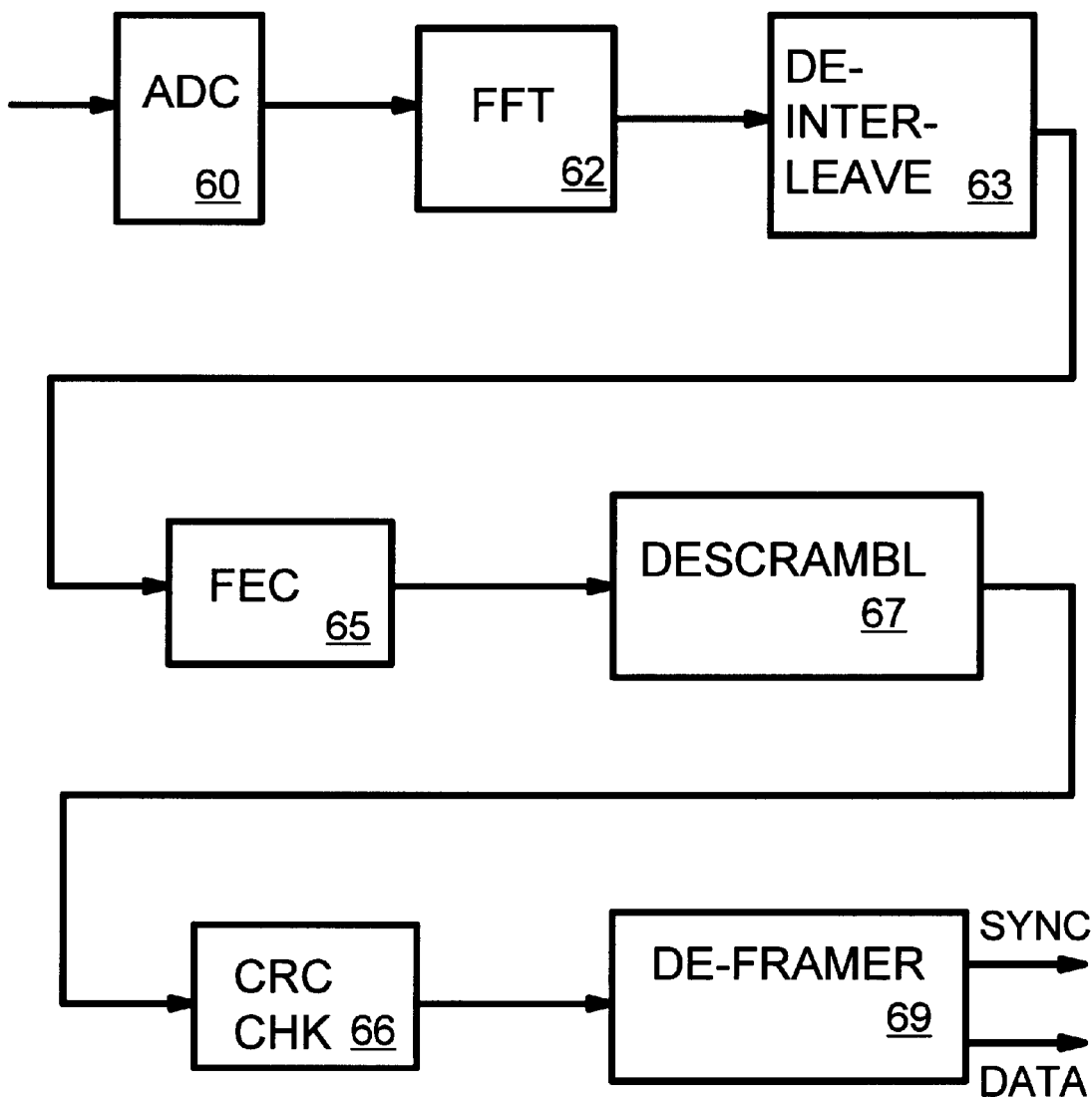
FIG. 7 is a diagram of the DSL receiver function.

Receiver Block Diagram—FIG. 7

FIG. 7 is a diagram of the DSL receiver function. The signal from the copper-pair telephone line is applied to analog-to-digital converter ADC 60 and converted to digital amplitude time-points. The analog signal is also applied to the PMD layer, which creates a stream of 4-KHz data symbols using FFT 62. The resulting symbols are de-interleaved by block 63, and passed through FEC block 65 for error correction. The corrected data is passed through de-scrambler 67 and CRC checker 66. De-framer 69 splits the data into user payload data and sync bytes.

The sync bytes contain the EOC, AOC and Indicator bits used to manage the modem. EOC bytes appear at frames 4n+2 and 4n+3, where n is 0, 1, 2 ... 16, but not n=8. AOC bytes appear at frames 4n and 4n+1, where n is 1, 2, ... 16. The frame number n is replaced with the sync byte index—$S_n$, where $S_n$ is the number of the sync byte in the superframe. $S_n$ will range from 1 to $68*N_s/M$, where M is the number of 4-KHz frames per mux data frame.

For example, the IB bytes at frames 1, 34, and 35 are instead found at sync-byte numbers 1, $32*N_s/M+2$, and $32*N_s/M+3$. The EOC bytes appear at sync byte numbers 4n+2 and 4n+3, where n is 0, 1, 2, ... 16/M, but not n=8/M. AOC bytes appear at sync byte numbers 4n and 4n+1, where n is 1, 2, ... 16/M.

Figure 8A:
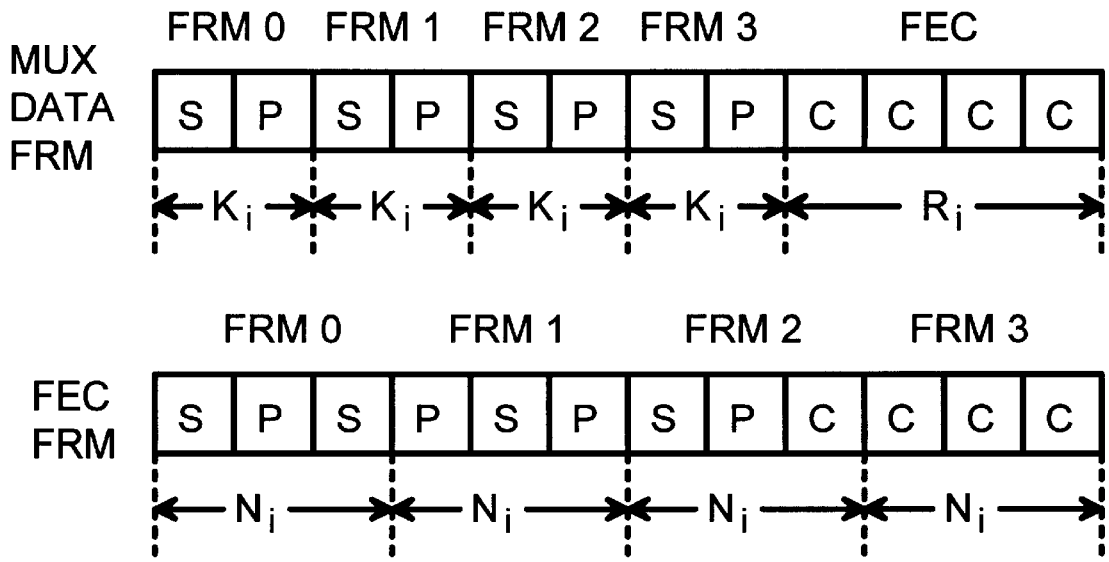
FIG. 8A illustrates low bandwidth efficiency of using standard framing at low line rates.
Figure 8B:
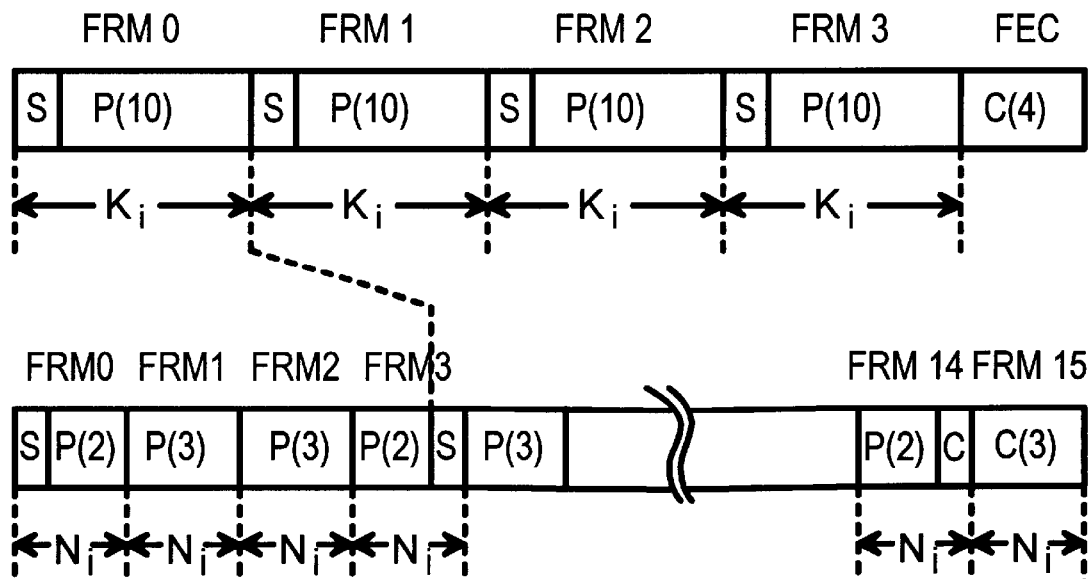
FIG. 8B highlights the efficiency of the improved framing structure for low line rates.

Higher Efficiency of Low-Line-Rate Mode—FIGS. 8A, 8B

FIG. 8A illustrates low bandwidth efficiency of using standard framing at low line rates. With a low line rate of 96 Kbps, each mux data frame has one sync byte S and one user payload byte P. Four FEC error-correction bytes C are appended to the mux data frames to form the FEC codeword. This codeword is transmitted as four 4-KHz frames, each frame having three bytes, $N_i$=3. Parameter S is 4 frames, $R_i$ is 4 FEC bytes, and the efficiency factor M is 1. $R_i/S$ is 1.

The bandwidth efficiency is the number of payload bytes divided by the total number of bytes in the transmitted codeword. There are a total of 4 user payload bytes P—one from each of the four mux data frames. The codeword has a total of 12 bytes. Thus the efficiency is 4/12, or 33%. Of the 96 Kbits line rate, only 32 Kbits is used for payload data. This is a very low efficiency and highlights how useless the high-rate standard is when scaled to lower line rates.

FIG. 8B highlights the efficiency of the improved framing structure for low line rates. Like FIG. 8A, the line rate remains at 96 Kbits. The sync and FEC overhead is significantly reduced by allowing multiple 4-KHz frames for each mux data frame. The size of the mux data frames increases from 2 to 11 bytes ($K_i$=11). This increases the number of payload bytes transmitted per sync byte, improving efficiency.

The number of mux data frames per codeword remains the same, at four, but the efficiency factor M is set to 4, so that there are four 4-KHz frames for each mux data frame. The 4 mux data frames thus produce 16 4-KHz frames for the codeword, so S is 16 frames per codeword. The number of FEC bytes, $R_i$, remains at 4. $R_i/S$ is 4/16, or 0.25.

The bandwidth efficiency, the number of payload bytes divided by the total number of bytes in the transmitted codeword, is dramatically improved by the longer codeword. For the 16-frame codeword, there are a total of 40 user payload bytes P—ten from each of the four mux data frames. The codeword has a total of 48 bytes. The efficiency is 40/48, or 83%. Of the 96 Kbits line rate, only 16 Kbits is used for overhead. The efficiency is increased from 33% to 83% in this example for the low 96 Kbits line rate.

FIG. 9 is a table comparing efficiencies of various configurations using the bi-level framing structure. In the normal mode, the efficiency factor M is 1, and $F_s$ is also 1. Normal mode is used for high line rates. The efficient mode is the improved framing structure for low line rates. The efficiency factor M is 4, as is $F_s$. Comparisons of the framing efficiency for the two modes are shown for line rates of 96, 128, and 256 Kbits. Various levels of error correction are also compared. No error correction ($R_i$=0), and error correction with 4 and 16 FEC bytes per codeword ($R_i$=4, 16) are compared for the 3 line rates.

With no error correction, parameter S is 1 for normal mode but 4 for efficient mode. With 16 FEC bytes, S is 16 for both modes. For 4 FEC bytes, S is 4 for normal mode but set to 16 for efficient mode. S is the number of 4-KHz frames per codeword. These parameters are chosen based on how much coding gain is required. Long or noisy lines require more gain. Also, the amount of delay that can be tolerated is a consideration for parameter S, since higher S means a longer latency.

In all cases, efficiency (payload bytes per codeword) is improved using the efficient mode's improved framing. The improvement in efficiency is more dramatic when error correction is enabled and for lower line rates. The highest level of error correction, $R_i$=16, shows some reduced effectiveness of the efficient mode due to the large number of FEC bytes. For large values of R such as R=16 and S=16, the only gain in efficiency comes from the reduced number of Sync bytes.

Figure 10:
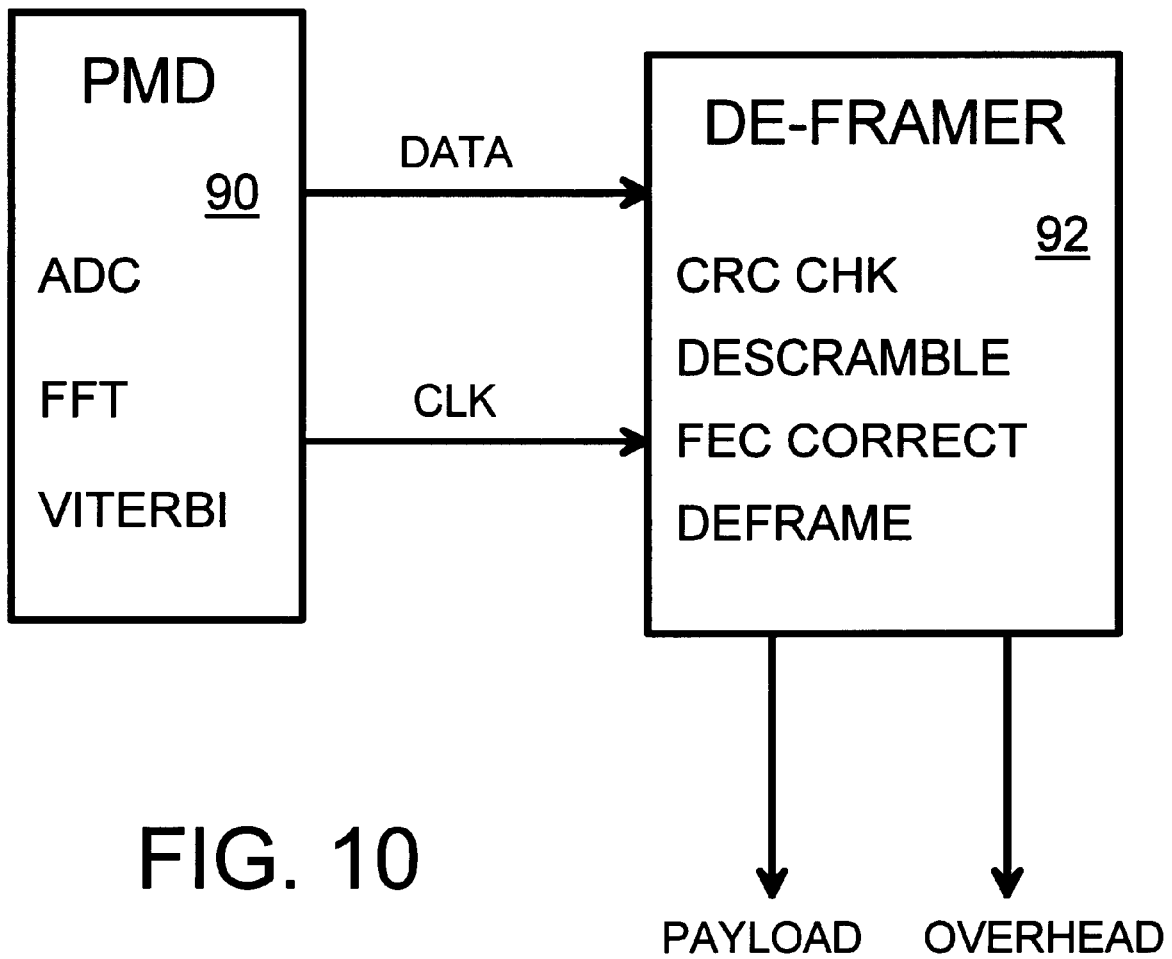
FIG. 10 is a diagram showing a physical implementation of the DSL receiver.

IC Implementation—FIG. 10

FIG. 10 is a diagram showing a physical implementation of the DSL receiver. Two or more high-integration integrated circuit chips can be used. Physical-media device PMD 90 is connected to receive the analog signal from the copper pair phone line. PMD 90 contains an analog-to-digital converter (ADC), the FFT transformer, and a viterbi decoder. A clock is generated and used to transfer the decoded data stream to de-framer 92.

De-framer 92 performs a CRC check of the data stream, and de-scrambles the data. The stream is de-framed by removing the sync and FEC bytes. Error correction is performed using the FEC bytes. The user payload bytes and the control and overhead bytes are output.

Advantages of the Invention

The improved bi-level framing structure provides DSL at both high and low line rates. A single DSL board or chip set may be used for both high-rate and low-rate applications. A more efficient framing structure is well-suited for low line rates. The 4 KHz system clock is still used for physical framing, the bandwidth available for user payload bytes is increased at low line rates. The framing structure for high line rates is extended to provide more bandwidth efficiency at lower line rates. A unified framing structure for both high and low rate DSL is provided.

The physical framing based on the 4 KHz system clock is maintained, but some aspects of the framing are relaxed to improve efficiency. The one-to-one correspondence of the mux data frames to the physical 4-KHz frames is eliminated. Some but not all aspects of framing is then based on the 4-KHz system clock. This improves efficiency while still maintaining backwards compatibility.

Alternate Embodiments

Several other embodiments are contemplated by the inventors. For example additional encoding such as trellis/viterbi may be included. Many types of DSL may benefit from the invention besides ADSL. Many implementations, both in hardware and in firmware, are possible for many functional blocks. The efficiency factor M may be changed to other values, such as 8, 16, etc. Even values other than integers may be used in some cases. Other parameters and framing aspects may be modified. Additional fields such as the embedded control fields may be inserted. The 4 KHz system clock may be adjusted somewhat.

While 8-bit bytes have been described in the description, other data sizes can be substituted as the "bytes". Other line rates and frame rates may be substituted.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A bi-level framer for framing data transmitted over a line at a low line rate, the bi-level framer comprising:

mux-framing means, receiving user payload bytes and a sync byte, for generating mux data frames by appending $N_p$ user payload bytes to the sync byte;

correction-byte means, receiving a plurality of S/M of the mux data frames from the mux-framing means, for generating a plurality of $R_i$ forward-error correction FEC bytes;

symbol-framing means, receiving the plurality of S/M mux data frames from the muxframing means and receiving the plurality of $R_i$ FEC bytes from the correction-byte means, for generating a plurality of S symbol frames from the S/M mux data frames and the $R_i$ FEC bytes; and a symbol generator, responsive to a system clock, for generating a symbol for transmission over the line for each symbol frame from the symbol-framing means;

wherein M is an efficiency factor that is 1 when transmitting at a high line rate above the low line rate, but a positive integer greater than one when transmitting at the low line rate, whereby one symbol is transmitted for each mux data frame at the high line rate, but M symbols are transmitted for each mux data frame at the low line rate.

2. The bi-level framer of claim 1 wherein the symbol clock has a constant frequency for all line rates including the low line rate and the high line rate, whereby symbols are transmitted at a constant rate.

3. The bi-level framer of claim 2 wherein the constant frequency of the symbol clock is about 4 KHz.

4. The bi-level framer of claim 3 wherein symbols transmitted at the low line rate represent fewer of the user payload bytes than symbols transmitted at the high line rate.

5. The bi-level framer of claim 4 wherein M is 2 or 4 for the low line rate and wherein S is 4, 8 or 16, and wherein S/M is an integer.

6. The bi-level framer of claim 5 wherein the symbol generator performs an inverse fast-Fourier transform (IFFT) to generate each symbol, wherein one IFFT operation is performed for each symbol transmitted.

7. The bi-level framer of claim 6 wherein the low line rate is at least 64 K bits per second but no more than 256 K bits per second and wherein the high line rate is greater than 1 Megabits per second.

8. A Digital-Subscriber Line (DSL) transmitter for transmitting at a high line rate and at a low line rate over a copper-pair line, the DSL transmitter comprising:

a user-input stream of user payload data;

a first multiplexer, coupled to the user-input stream to receive the user payload data, for inserting sync bytes, the first multiplexer outputting the user payload data with the sync bytes as a mux data frame;

a correction-term generator, coupled to the first multiplexer, for generating a correction term for a group of the mux data frames, the correction term for correcting errors during transmission of the group of mux data frames;

a second multiplexer, coupled to the first multiplexer, for attaching the correction term from the correction-term generator to the group of mux data frames to form a codeword;

a symbol clock; and an inverse fast-Fourier transformer, coupled to receive the codeword, for transforming the codeword into a plurality of S symbols for transmission over the copper-pair line, the inverse fast-Fourier transformer generating a symbol in response to the symbol clock;

wherein for the high line rate, the group of the mux data frames has exactly S mux data frames, but for the low line rate, the group of the mux data frames has SM mux data frames, wherein S, M and S/M are positive integers, whereby a rate of the mux data frames is reduced relative to a symbol rate of symbols generated in response to the symbol clock for the low line rate, but the rate of the mux data frames is about equal to the symbol rate for the high line rate.

9. The DSL transmitter of claim 8 wherein one symbol is generated by the inverse fast-Fourier transformer for each period of the symbol clock.

10. The DSL transmitter of claim 8 wherein the correction term comprises a plurality of bytes, the correction term being Reed-Solomon forward-error-correction FEC bytes.

11. The DSL transmitter of claim 8 further comprising:

a digital-to-analog converter (DAC), coupled to receive the symbol from the inverse fast-Fourier transformer, for converting the symbol to a series of analog voltages for driving the copper-pair line.

12. The DSL transmitter of claim 11 further comprising:

a cyclical-redundancy-check (CRC) generator, receiving the codeword from the first multiplexer, for generating a check term;

a framer, coupled to the first multiplexer and coupled to receive the codeword from the CRC generator, for adding the check term to the codeword before transformation to the symbol.

13. The DSL transmitter of claim 12 further comprising:

a scrambler, coupled to the first multiplexer, for outputting scrambled data to the second multiplexer before transformation to the symbol.

14. A method for framing user payload data for transmission over a Digital-Subscriber Line (DSL), comprising:

combining a sync byte with a plurality of N payload bytes of the user payload data to form a mux data frame and forming other mux data frames from the sync byte and N payload bytes;

generating error-correction bytes for a plurality of S/M mux data frames, wherein S and M are each positive integers;

appending the error-correction bytes to the plurality of S/M mux data frames to form a codeword;

repartitioning the codeword into S physical frames for transmission;

converting each of the S physical frames to a symbol for transmission over a DSL telephone line;

whereby the codeword has S physical frames but S/M mux data frames.

15. The method of claim 14 further comprising:

when the DSL telephone line is configured for a low line rate, setting M to an integer of at least 4, when the DSL telephone line is configured for a high line rate, setting M to one (1), whereby at least four of the physical frames are transmitted for each mux data frame for the low line rate, but one of the physical frames is transmitted for each mux data frame for the high line rate.

16. The method of claim 14 wherein the step of converting each of the S physical frames to a symbol for transmission over a DSL telephone line comprises:

transforming the S physical frames into amplitude time-points by performing an inverse fast-Fourier transform (IFFT);

transmitting the codeword as the S physical frames after IFFT transformation, whereby the S physical frames are transformed by the IFFT before transmission.

17. The method of claim 16 wherein symbols are generated by the IFFT at a rate of 4 KHz for both high and low line rates of the DSL telephone line, whereby the symbol rate is a constant 4-KHz rate.

18. The method of claim 14 wherein at least one error-correction byte is generated for each mux data frame, but for the low line rate, M of the physical frames carry just one error-correction byte, whereby error-correction overhead for the physical frames is reduced for the low line rate.

19. The method of claim 14 further comprising:

trellis encoding of the physical frames before conversion to symbols.

20. The method of claim 15 wherein the low line rate is at least 64 K bits per second but no more than 256 K bits per second, while the high line rate is greater than 1 Megabits per second; and wherein an overhead for transmitting sync bytes and the error-correction bytes is reduced when M is greater than one.

* * * * *